United States Patent Office 3,317,141
Patented May 2, 1967

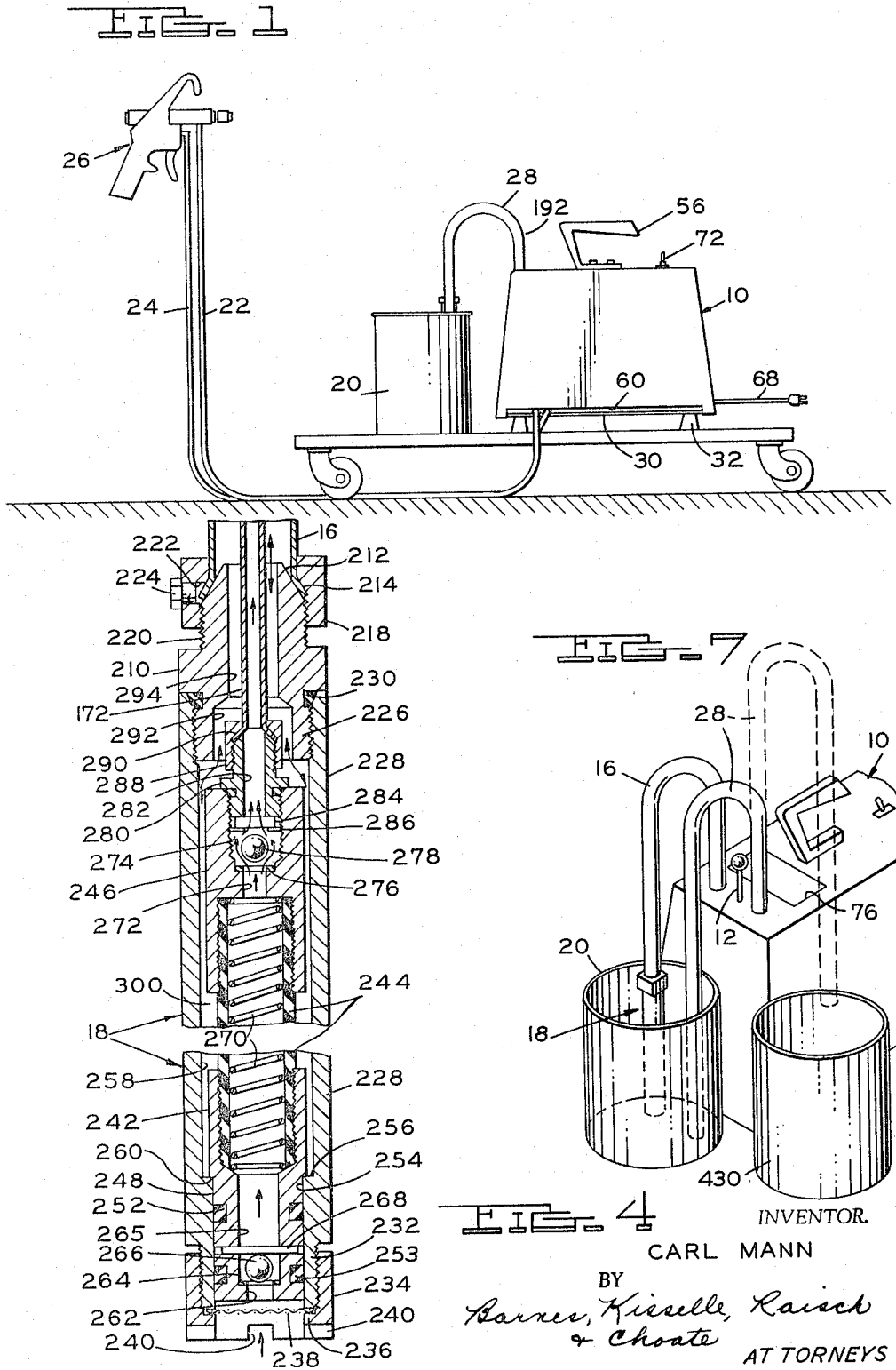

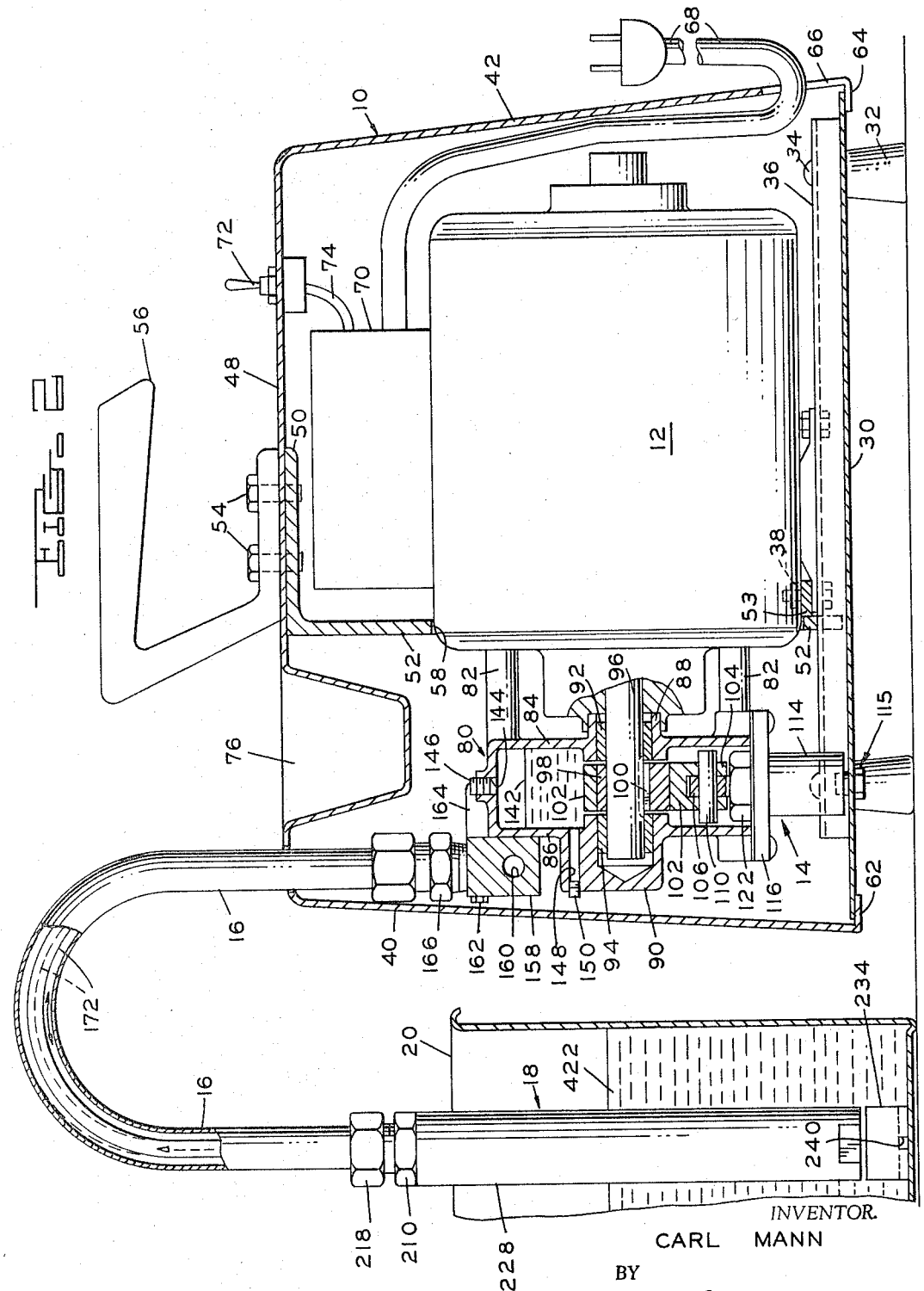

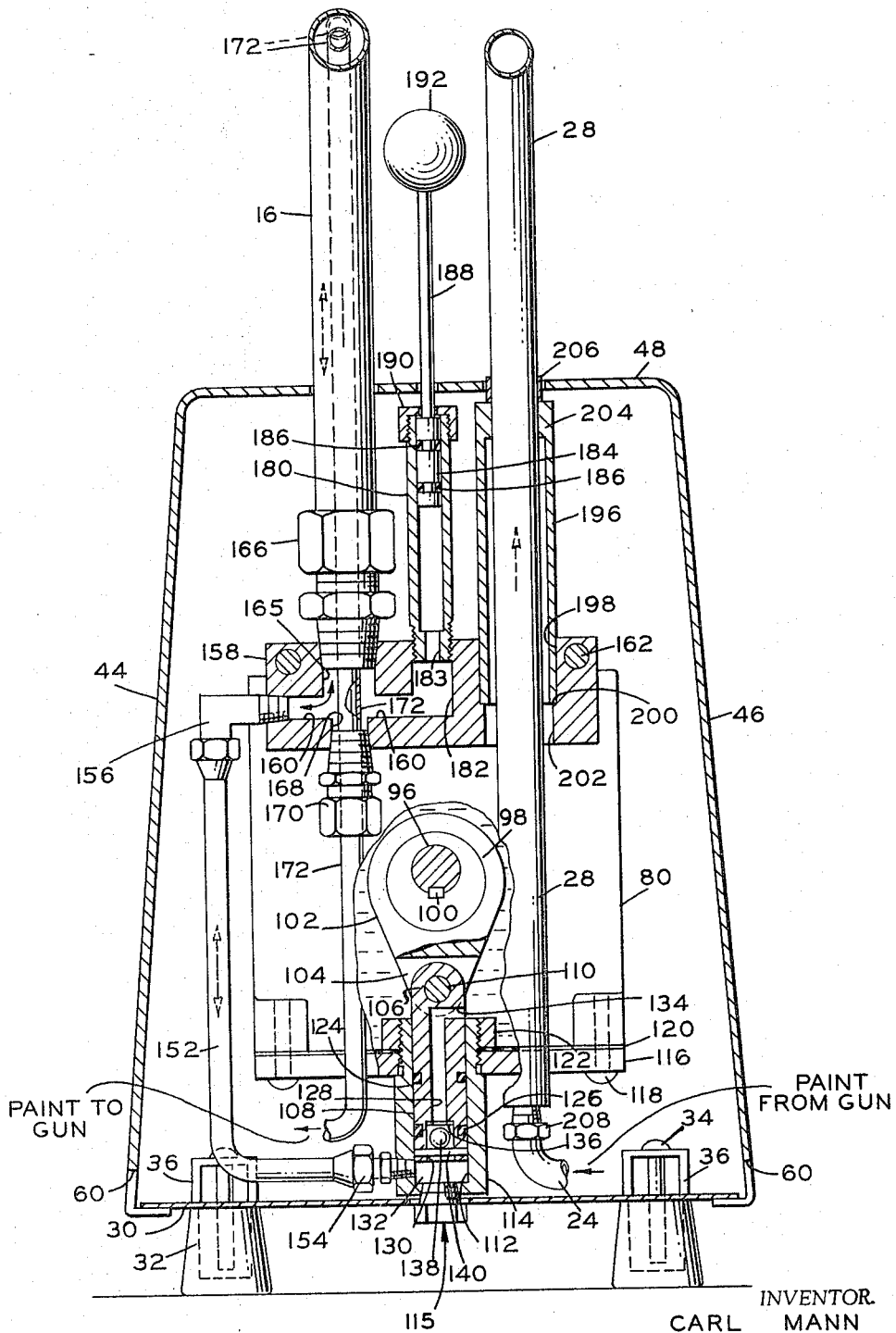

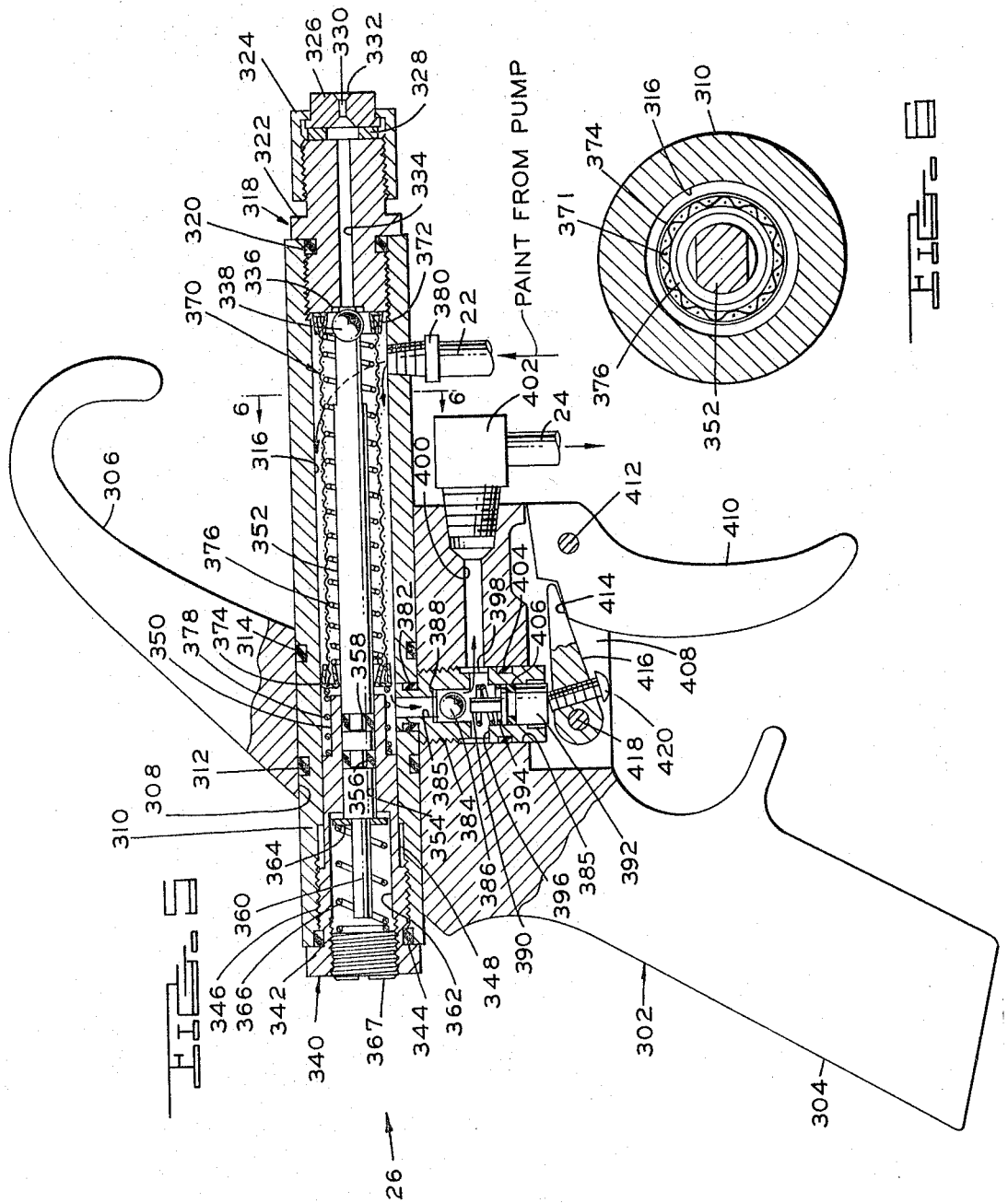

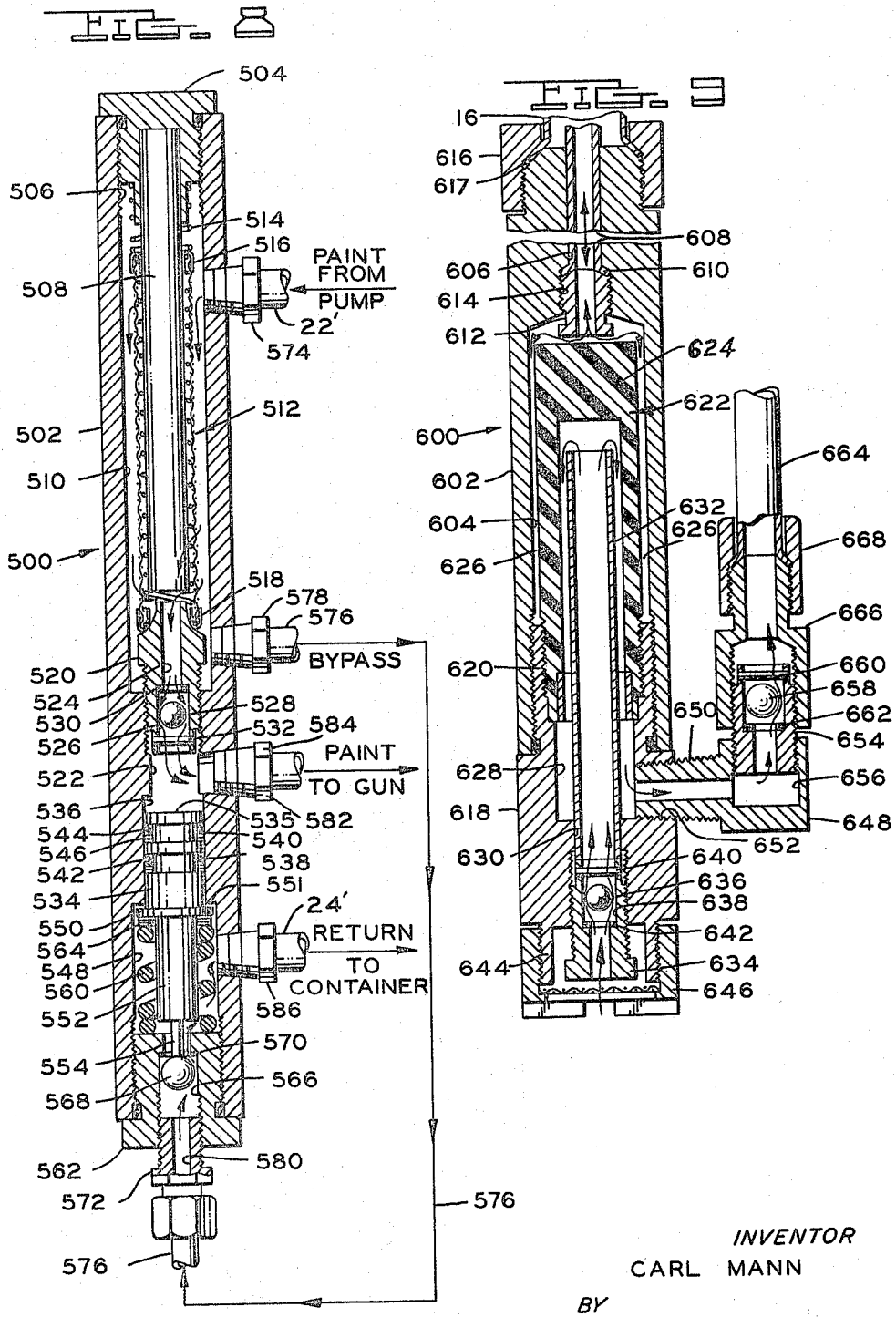

3,317,141
AIRLESS LIQUID SPRAY GUN HAVING A DIAPHRAGM PUMP AND FILTERING APPARATUS
Carl Mann, 1228 Yorkshire, Grosse Pointe Park, Mich. 48230
Filed Oct. 26, 1964, Ser. No. 406,478
17 Claims. (Cl. 239—127)

This invention relates to improvements in liquid spraying apparatus of the airless type wherein liquid is forced under high pressure through a small orifice to produce a spray, and more particularly to improved apparatus for airless spraying of paint and other liquid coating materials.

In the airless paint spraying process, liquid paint is pressurized to pressures in the order of 1200 to 2500 p.s.i. and subsequently released through a specially designed, very small orifice. The orifice design and sudden release of pressure combine to effect a fan-type controllable spray pattern which will adhere to the surface against which it is directed with a minimum of bounceback, overspray or dust distribution. Airless spraying processes used industrially provide fine finishes and eliminate the need for exhaust fans, spray booths, etc. required by conventional air-aspiration spray processes and apparatus. The latter process is impractical for use indoors due to the high velocity carrier air stream which is used to atomize the paint. This air stream rebounds from the painted surface, carrying quantities of small droplets of paint with it, thereby wasting paint due to excessive overspray and causing prohibitive paint dust distribution.

In spite of the above advantages of airless spraying over conventional air spray systems, presently available airless spraying equipment requires great quantities of compressed air as the prime source of power. The compressed air is used as an expansion fluid to drive a reciprocating air motor which in turn operates a reciprocating grease-type paint pump. Due to the high output pressures required, such pumps are generally slow speed reciprocating pumps which cause pressure fluctuations of large magnitude and low frequency, which in turn cause irregularities in the spray pattern as the pump reverses stroke unless the air motor is specifically controlled such that its reversing action transpires almost instantaneously. Since this type of apparatus requires an air compressor and its associated equipment, it is not readily portable and the total cost of the apparatus is high.

Accordingly, it is an object of the present invention to provide improved airless spraying apparatus which is lightweight and compact and hence easily hand transportable.

Another object is to provide improved liquid spraying equipment having the advantages of the airless spraying process while eliminating the need for air compressors and their associated air hoses, filters and pressure regulators, thereby providing significant cost savings.

A further object is to provide an airless spraying apparatus capable of elevating the pressure of sprayable liquids to high pressures on the order of 1500 to 3000 pounds per square inch and subsequently spraying such liquids in a manually controllable and practical fashion.

Still another object is to provide completely portable liquid spraying equipment which may be used for interior as well as exterior work and in locations where only household electrical outlets are available as a power source.

Another object is to provide an airless liquid spraying system of the above-character capable of being powered by a prime mover which develops a rotary motion output, thereby permitting the use of either an electric motor or, for applications where no external power is readily available, a small internal combustion engine.

Still another object of the present invention is to provide liquid pumping apparatus capable of pumping liquid at high pressures for sustained periods and able to withstand the abrasive action of such liquids as titanium dioxide paint.

A still further object is to provide airless liquid spraying equipment of comparatively simple and inexpensive construction which is reliable in operation and not easily susceptible to clogging or jamming by dirt or solid particles in the liquid being sprayed.

Yet another object of the present invention is to provide an improved spray gun for use with airless spray apparatus incorporating an improved filtering and/or trigger-valve systems.

A still further object is to provide an airless spray system in which an interconnected spray gun does not store liquid to be sprayed under high pressure when the trigger is in the off position, thereby eliminating the problem of triggering a dangerous jet of liquid spray should the gun be accidentally dropped or otherwise unintentionally triggered.

Other objects, features and advantages of the present invention will become apparent from the subsequent detailed description of an exemplary embodiment of the invention as shown in the accompanying drawings wherein:

FIG. 1 is an elevational view of a portable airless paint spraying unit of the present invention wherein, for convenience, the pumping apparatus and paint container are placed on a conventional dolly, the spray gun of the invention also being shown connected by hoses to the pump apparatus.

FIG. 2 is an enlarged side elevational view of the pumping apparatus, partly in vertical center section.

FIG. 3 is an end elevational view of the apparatus enclosed within the cabinet of FIG. 2, looking toward the left end of the cabinet as viewed in FIG. 2, with the cabinet and some of the parts enclosed therein being broken away and/or shown in vertical section.

FIG. 4 is a vertical center section through the paint pumping unit of the apparatus.

FIG. 5 is a side elevation of the spray gun of the apparatus of the invention, shown partly in vertical center section.

FIG. 6 is a vertical section taken on the line 6—6 of FIG. 5.

FIG. 7 is a fragmentary perspective view illustrating the manner in which the return tube is manipulated between a paint container and a waste can.

FIG. 8 is a longitudinal center section through a modified supply control valve of the present invention.

FIG. 9 is a vertical center section through a modified paint pumping unit of the present invention.

Referring to FIGS. 1 and 7, the airless liquid spray apparatus of the present invention as exemplified by the illustrated portable embodiment generally includes a cabinet 10 which houses an electric motor which, via an eccentric crank, reciprocates a plunger at high speed in a cylinder to thereby generate a pulsating fluid pressure in the cylinder. The pulse chamber of the cylinder communicates via a closed system including a conduit 16 with a paint pump 18 disposed upright in a container 20 filled with paint. The pulsating pressure fluid causes a tubular diaphragm of the paint pump to alternately contract and expand, thereby pumping paint from the container up a tube disposed within conduit 16 which communicates with a high pressure hose 22. Hose 22 delivers pressurized paint to the inlet of a hand-held spray gun 26, and another hose 24 provides a return connection from the gun to a return tube 28, the end of which is also normally disposed in container 20.

Cabinet

The details of cabinet 10 and the components housed therein are best shown in FIGS. 2 and 3. Cabinet 10 comprises a base plate 30 supported on four rubber feet 32 attached to channels 36 which extend lengthwise along the sides of plate 30. Channnels 36 form a rigid support for an electric motor 12 which, for example, may be a three-quarter horse power motor rated at 1725 r.p.m. and operable on 110 volt A.C. house current. The mounting frame of motor 12 is attached by bolts 38 to channels 36.

Cabinet 10 has a cover consisting of a front wall 40, rear wall 42, side walls 44 and 46 and a top wall 48, and may be molded from suitable plastic material into the one-piece, five-sided shape shown in the drawings. Top wall 48 is secured to a horizontal arm 50 of a vertical frame plate 52 by screws 54 which extend through the bottom arm of a carrying handle 56 and wall 48 and thread into arm 50.

Plate 52 extends completely across the interior of cabinet 10 and has a central opening 58 which receives the front end of the motor casing, plate 52 having arms 53 secured by bolts 38 to motor 12. Side walls 44, and 46 of the cabinet each have a vent opening 60 (FIGS. 1 and 3) extending along the lower edge thereof. Plate 52 serves as a partition dividing the interior of the cabinet into front and rear compartments (left and right as viewed in FIG. 2) so that the cooling fan (not shown) of the motor 12 draws outside air via vents 60 into the front compartment and then propels its axially through the motor and out into the rear compartment from which it is expelled via vent 60.

The front and rear walls 40 and 42 have their lower edges 62 and 64 turned in to snap under base 30. Rear wall 42 has an opening 66 through which a power cord 68 enters the cabinet for connection to the motor controller unit 70. An on-off toggle switch 72 is mounted in top wall 48 and is connected by a lead 74 to unit 70. Top wall 48 also has a well 76 molded therein to provide a readily accesssible pocket for storage of filters, nozzles, and other spare parts.

Pulse pump

As shown in FIGS. 2 and 3, the front compartment of the cabinet houses the pulse pump unit 14. This unit includes a box-like casting 80 having four integral legs 82 extending perpendicularly from its inner side 84 which abut the end face of motor 12, the ends of legs 82 each being secured by a bolt to the motor. Side 84 and the side 86 of casting 80 opposite thereto each have a central hub portion 88 and 90 respectively which are co-axially bored to receive bushings 92 and 94 respectively. A drive shaft 96 of motor 12 is journalled in bushings 92 and 94 and carries an eccentric 98 which is secured by a key 100 to shaft 96 for rotation therewith. A teardrop-shaped connecting rod 102 (FIG. 3) encircles and rotatably reeives eccentric 98 in the big end of the connecting rod. The small end of rod 102 is bifurcated to form a pair of arms 104 (FIG. 2) which receive therebetween the flat upper end 106 of a piston 108 (and a wrist pin 110 pivotally connects rod 102 to piston 108. Piston 108 reciprocates in the bore 112 of a cylinder 114, the upper end of which extends upwardly through a bottom plate 116 which in turn is secured by bolts 118 to casting 80. A gasket 120 is disposed between plate 116 and the bottom edge of casting 80. A nut 122 is theaded on the upper end of cylinder 114 to insure a tight joint between the cylinder and plate 116.

Piston 108 carries a pair of O-rings 124 and 126 to provide a sliding sealed fit of the piston in cylinder 114. Piston 108 has a passage 128 extending axially therein which communicates at its lower end with a counterbore 130 which in turn communicates with the working chamber 132 of cylinder 114. The upper end of passage 128 communicates via a radial passage 134 with the interior of casting 80 in all positions of piston 108. Counterbore 130 has a ring 136 secured at its upper end against the shoulder formed between passages 128 and 130 which serves as a valve seat for a check ball 138. Both ring 136 and ball 138 are made of hard, wear resistant material such as tungsten carbide. Ball 138 is loosely confined in counterbore 130 by a pin 140 mounted transversely in the lower end of piston 108.

Casting 80 serves as a crankcase which is kept filled with hydraulic fluid 142 by way of a fill opening 144 (FIG. 2) normally closed by a threaded breather plug 146. Excess fluid is tapped off by way of a passage 148 in boss 90 which is normally closed by a threaded plug 150.

The working chamber 132 of cylinder 114 is connected to a tube 152 (FIG. 3) by a connector 154 which is threaded into an opening in the side of cylinder 114 at a point below the lowermost position of piston 108. The upper end of tube 152 is secured by a connector 156 to a manifold 158 and communicates with a horizontal passage 160 formed therein. Manifold 158 is mounted against wall 86 of crankcase 80 by cap screws 162 which thread into bosses 164 of the crankcase (FIG. 2). Passage 160 is intersected by a larger diameter passage 165 (FIG. 3) which is threaded to receive the nipple of a connector 166. A smaller diameter passage 168 also intersects passage 160 co-axially with passage 165 and threadably receives a connector 170 therein. A tube 172, preferably made of steel, extends upwardly through connector 170, the connector clamping tube 172 in sealed relation with passages 160 and 168. Tube 172 continues upwardly through passage 165, through connector 166 and into the large diameter tube 16 which is clamped at one end by connector 166. It is to be noted that an annular clearance space is provided between tube 172 and the surrounding connector 166 to provide communication between passage 165 and the conduit formed between tubes 16 and 172.

Priming pump

Manifold 158 also supports a manually operated priming pump comprising a cylinder 180 threadably secured at its lower end in the upper end of a branch passage 182 of manifold 158. Cylinder 180 communicates via an opening 183 in its lower end with passage 182 which in turn communicates with passage 160. A piston 184 slidably reciprocates in cylinder 180 and has a sealed fit therein due to a pair of O-rings 186 carried on the piston. Piston 184 has a stem 188 secured to its upper end which extends upwardly through a cylinder cap 190 and carries a knob 192. The space above piston 184 is vented via the clearance space between stem 188 and cap 190.

Return tube

Manifold 158 also supports the return tube 28 by means of a sleeve 196 fixed at its lower end in a counterbore 198 in manifold 158, the lower end of sleeve 196 resting on a shoulder 200 formed between counterbore 198 and bore 202. The upper end of sleeve 196 has a reduced diameter bushing portion 204 which slidably receives tube 28 therethrough. Tube 28 carries a collar 206 suitably secured thereto which abuts the upper end of sleeve 196 to thereby limit downward movement of tube 28 in sleeve 196. The lower end of tube 28 is connected by a fitting 208 to the return hose 24. Fitting 208 abuts the underside of manifold 158 and thereby defines the upper limit of travel of tube 28 when it is manually raised for swiveling movement as illustrated in FIG. 7.

Paint pump

Referring to FIGS. 2 and 4, paint pump 18 generally comprises a diaphragm in the form of a flexible openended tube which isolates the fluid medium being pumped, e.g., paint, from a power pulsed liquid, e.g., the hydraulic fluid 142 from pulse pump 14. Pump 18 is supported on the outer end of tube 16 by a double-ended threaded connector 210 (FIG. 4) having a conical upper end 212 which fits into the outwardly flared end 214 of tube 16. A nut 218 is threadably received on the upper nipple 220 of connector 210 and clamps tube 16 tightly onto connector 210. Nut 218 has a passage 222 normally closed by a plug 224 which may be removed for bleeding the pump end of tube 16. The lower nipple 226 of connector 210 threadably receives the upper end of a sleeve 228, a suitable seal 230 being interposed between the hexagonal nut portion of connector 210 and the upper end of sleeve 228. The lower end of sleeve 228 has a nipple 232 on which an inlet fitting 234 is threadably secured. Fitting 234 has an internal flange 236 which clamps a filter screen 238 against the lower end of nipple 232. The lower end of fitting 234 has four radial slots formed therein to permit ingress of paint to the bore of fitting 234 when it is resting on the bottom of the paint container 20, as shown in FIG. 2.

Sleeve 228 forms a rigid, substantially non-expansible casing which completely encloses a tubular diaphragm pump unit which, starting at its lower end, comprises an inlet fitting 242, a resilient tubular diaphragm 244 secured at its lower end to fitting 242, and an outlet fitting 246 secured to the upper end of diaphragm 244. Inlet fitting 242 has a cylindrical stem 248 which may be grooved to carry a pair of O-rings 250 and 252, so that stem 248 is received with a sliding sealed fit in a counterbore 254 formed in the lower end of sleeve 228. Sleeve 228 has an internal shoulder 256 at the junction of counterbore 254 and the main bore 258 of the sleeve, fitting 252 likewise having a shoulder 260 which abuts shoulder 256. The lower end of fitting 242 has an internal flange 262 which defines an inlet opening spaced above filter 238. A hard, wear resistant ring 264 is disposed in a bore 265 in stem 248 and is secured on flange 262 to form a valve seat for an inlet check ball 266, both seat 264 and ball 266 being preferably made of tungsten carbide or other hard wear resistant material. Ball 266 floats between seat 264 and a retainer pin 268 which extends diametrically through stem 248.

The upper end of fitting 242 is internally threaded and has the lower end of diaphragm 244 securely fixed therein. Preferably diaphragm 244 consists of a high pressure hose such as that known commercially as the "Imperial" rubber covered rayon braid hose, Model No. P/N C408, sold by the Imperial Brass Manufacturing Company of Chicago, Illinois. The outer surface of the hose is initially smooth, but the hose is twisted into fitting 242 so that the internal threads thereof cut mating threads into the outer rubber covering of the hose to thereby provide a secure and pressure tight joint. The upper end of hose 244 is similarly secured in the internally threaded sleeve portion of outlet fitting 246. Disposed within hose 244 is a coil spring 270 which, by way of illustration, has a free length of five and one-half inches with 29 coils of .080 inch diameter wire and having an outside diameter of .480 inch to provide a spring rated at 30 pounds per axial inch. The spring is the same length as the hose and fits closely within the bore of the hose when the spring and bore are in their relaxed condition.

Fitting 246 has an outlet passage 272 which connects the outlet end of hose 244 with a valve chamber 274 formed in fitting 246. Chamber 274 contains another tungsten carbide ring 276 which is secured on a shoulder of the chamber and forms a valve seat for another ball check 278, also made of tungsten carbide or other hard material, which in turn floats between ring 276 and a transverse stop pin 284 secured in the lower end of an oulet fitting 280. Fitting 280 is threadably secured in chamber 274 and has a central passage 282 communicating around pin 284 with chamber 274. The upper end of fitting 280 comprises a nipple which threadably receives a nut 288 which clamps the lower flared end 290 of tube 172 against the conical end of fitting 280. Nut 288 is disposed in a considerably larger diameter counterbore 292 of connector fitting 210 to provide an annular clearance space therebetween. Fitting 210 has a bore 294 coaxial with counterbore 292 which likewise receives tube 172 with a large annular clearance therebetween.

Further annular clearance spaces are provided between fitting 246 and the interior wall of sleeve 228 and between the diaphragm hose 244 and the interior wall of sleeve 228 to thereby define an annular pumping chamber 300. Chamber 300 is closed at its bottom end by fitting 242 and communicates at its upper end via the annular clearance spaces in bores 292 and 294 with the annular space between tube 172 and tube 16. It is noted that there is also an axial clearance between nut 288 and fitting 210 to allow for vertical movement of fitting 246 during operation of the pump. It is also to be noted that tubes 16 and 172 are each in the form of an inverted U and are rigidly interconnected only at manifold 158. The difference in diameters of the two tubes 16 and 172 permits vertical movement of the gooseneck of tube 172 within the gooseneck of tube 16, as illustrated by the solid and broken line showings thereof in FIG. 2. It is important that the above-described clearance relationships be observed for proper operation of the paint pump, as will become apparent subsequently herein.

*Spray gun*

Referring to FIGS. 5 and 6, the spray gun 26 of the apparatus of the present invention comprises a body 302 of pistol-like configuration, preferably of aluminum die cast construction, having a handle portion 304 at one end and a hook 306 at the other end. Body 302 has a through-bore 308 which receives a cylindrical barrel 310 which extends from both ends of the bore. Barrel 310 carries a pair of spaced O-rings 312 and 314 which provide a sealed zone in bore 308 disposed axially between the O-rings. Barrel 310 has a bore 316 extending axially therethrough which threadably receives a nozzle fitting 318 in its forward end. A sealing gasket 320 is disposed between the hexagonal flange 322 and the threaded stem of fitting 318. A collar 324 is threadably received on the forward end of fitting 318 and clamps a spray nozzle 326 against a washer 328 which in turn abuts the front face of fitting 318. Nozzle 326 may be selected from commercially available airless paint spray nozzles such as those made by the Delavan Manufacturing Company of West Des Moines, Iowa. Such nozzles have a restricted orifice 330 which communicates with a fan-shaped, slit-like outlet 332 having a predetermined flare angle. Such nozzles are made of highly resistant wear material, such as tungsten carbide, and are available in a wide range of sizes with respect to the diameter of orifice 330 and the flare angle of outlet 332. With the apparatus of the present invention wherein pressures of about 2,000 pounds per square inch are created, a nozzle 326 is usually selected having an orifice size ranging from .007 inch up to about .036 inch, with .015 to about .018 inch being the preferred range. By proper selection of orifice size and flare angle, different spray patterns and flow rates can be obtained which meet the requirements of the particular paint being sprayed and the desired surface finished characteristics.

Fitting 318 has an axial passage 334 which connects the nozzle with bore 316. A tungsten carbide ring 336 is mounted in a recess in the inner end face of fitting 318 to form a valve seat for a tungsten carbide ball 338, the ball seating on ring 336 to close communication between the bore 316 and fitting passage 334.

Bore 316 of barrel 310 is also threaded adjacent its rear end to receive a sleeve-like fitting 340 having a hexagonal portion 342, a seal 344 carried adjacent the nut portion 342, an externally threaded portion 346 which threads into barrel 310, a central portion 348 which fits in bore 316 and a reduced diameter stem portion 350. Fitting 340 supports a plunger 352 which slides in a bore 354 of fitting 340, the plunger carrying a pair of O-rings 356 and 358 having a seal fit therein. The rearward end of plunger 352 comprises stem 360 which extends into a counterbore 362 of fitting 340 and carries a washer 364 which abuts one end of a compression coil spring 366 housed in bore 362. The other end of spring 366 abuts an adjusting plug 367 threadably received in bore 362. Plunger 352 carries the ball 338 on its forward end, spring 366 forcing ball 338 against seat 336 with a force determined by the setting of plug 367.

A cylindrical filter cartridge 370 (FIGS. 5 and 6) is disposed within bore 316 between fittings 340 and 318 so as to loosely encircle plunger 352. Filter 370 is made of a fine mesh screen rolled into a cylinder, the ends of which are reinforced by grommets 372 and 374, the grommets being U-shaped in cross section and crimped over the ends of the screen. The filter is reinforced by a coil spring 376 disposed therein between grommets 372 and 374. A compression coil spring 378 encircles the stem 350 of fitting 340 and bears against the rear grommet 374 to press the filter forward so that the forward grommet 372 butts against the end face of fitting 318 to prevent entry of paint therebetween. Grommet 374 is received with a close sliding fit on plunger 352 to likewise prevent entry of paint therebetween.

The outlet end of the high pressure hose 22 is connected by a nipple 380 to bore 316 adjacent the forward end of filter 370. Near the rear end of filter 370 barrel 310 has a radial hole 382 which receives the stem of a valve housing 384 the upper end of which is threaded into the vertical bore 385 of body 302. A tungsten carbide check ball 386 floats in the valve chamber of housing 384 between a tungsten carbide ring 388 and a stem 390 of a plunger 392. A coil spring 394 biases plunger 392 downwardly away from ball 386. Valve housing 384 has radial ports 396 which connect the valve chamber with an annular groove 398 which in turn registers with an outlet passage 400 formed in body 302. Passage 400 communicates with the low pressure return hose 24 via a fitting 402 which is threadably secured in the enlarged end of passage 400. Suitable O-rings 404 and 406 are carried in grooves of housing 384 and plunger 392 respectively.

The gun body 302 is slotted at 408 to provide a cavity for receiving the upper end of a trigger 410 which is pivoted on the gun body by a pin 412. Trigger 410 is notched at 414 to receive the outer end of a lever 416 which is pivoted on a pin 418 in cavity 408. Lever 416 carries a screw 420 which engages the downwardly protruding end of plunger 392. The force of spring 394 is applied to lever 416 via screw 420, tending to rotate lever 416 clockwise as viewed in FIG. 5, which in turn tends to pivot the trigger counterclockwise to the off position shown in FIG. 5.

*Operation*

Assume that the pulse pump 14 and crankcase 80 have been filled with hydraulic fluid 142 as previously described, and that cord 68 has been plugged into any convenient 110 volt, 60 cycle electrical outlet. Next the pump 18 and return tube 28 are placed in container 20 which is filled with the liquid 422 (FIG. 2) to be sprayed, such as paint. With the trigger 410 in the off position, switch 72 is tripped to its on position, thereby energizing motor 12 which rotates shaft 96 at the speed of the motor, preferably 1725 r.p.m. Shaft 96 rotates eccentric 98 which, via connecting rod 102, imparts reciprocating motion to piston 108 at full motor r.p.m., thereby alternating pressurizing and de-pressurizing the essentially noncompressible body of hydraulic fluid contained within the isolated fluid medium pump circuit comprising cylinder chamber 132, tube 152, the annular conduit formed by the clearance space between tubes 16 and 172 and the annular chamber 300 of pump 18. The back pressure in this closed circuit normally maintains ball 138 seated on seat 136 so that hydraulic fluid cannot escape from chamber 132 via the piston passages 128 and 134

As piston 108 moves downwardly, pressure is built up in cylinder chamber 132 which is transmitted by the hydraulic fluid to chamber 300, wherein the pressure is impressed on diaphragm 244 and the paint contained therein. The pressurized paint forces ball 266 closed against its seat 264, and simultaneously forces ball 278 off its seat 276 to permit paint to be discharged from the diaphragm upwardly into tube 172. This reduction in the internal volume of the diaphragm 244 occurs as a result of axial contraction as well as some radial contraction of tubular diaphragm and spring 270. Hence it is necessary to allow for the corresponding axial movement of fitting 246, nut 288 and tube 172 within casing 228, fitting 210 and tube 16 respectively.

When piston 108 reverses and is on its upstroke, the volume of the closed fluid medium pump circuit including cylinder chamber 132 is increased, causing a corresponding drop in pressure in this circuit. The resilience of diaphragm 244, as materially aided by spring 270 contained therein, causes the diaphragm to expand as the pressure in chamber 300 drops, which in turn draws outlet check ball 278 closed. When the pressure within diaphragm 244 drops below that of the paint 422 in container 20 due to the expansion of the diaphragm, inlet ball 266 is forced off its seat and the paint is drawn into diaphragm 244 via radial passages 240, filter 238 and inlet 262.

The alternate compression or expansion of diaphragm 244 occurs as a rapid repetitive action at a frequency of, for example, 1725 cycles per minute which, with the particular equipment described above, causes pump 18 to develop an output pressure in the neighborhood of 2000 to 3000 pounds per square inch, depending to some extent upon the viscosity of the fluid medium being pumped.

One feature to be noted at this point is the automatic filling arrangement for the isolated fluid medium pump circuit. The inertia forces and pressure differentials acting on check ball 138 during reciprocation of piston 108 cause ball 138 to admit hydraulic fluid 142 from the oil reservoir of crankcase 80 directly into the pulsating column of hydraulic fluid if the volume of fluid in the system is depleted due to leakage. Also, when initially filling the closed pump circuit, check ball 138 and piston 108 operate as a continuous pump to flood the closed system as the hydraulic fluid is being drained through bleed-off passage 222. Since inlet passage 134 of piston 108 is always submerged in the liquid 142 in the reservoir of the crankcase 80, there is always liquid available to replenish the fluid pulsing system, assuming of course that the liquid level in the reservoir is maintained at a proper level.

To insure that refill valve 138 in piston 108 operates properly, diaphragm 244 should have enough resilience to exert sufficient expansion force during the upstroke of piston 108 to quickly return the volume of fluid to chamber 132 as piston 108 retracts so that additional fluid is not introduced into the pulsing system over and above what is actually required.

Pump 18 is self-priming when pumping thin fluid, but with high viscosity fluids the pumping system operates at too high a frequency to pick up a prime. In this event, pump 18 is primed manually by using the small priming pump including plunger 184 and cylinder 180. Plunger 184 is manually depressed and released with the motor turned off to produce a low frequency pulsation in the closed system which flexes diaphragm 244 in the manner previously described to cause ball checks 266 and 278 to operate at a greatly reduced speed. It has been found that five or ten strokes on the prime pump will generally produce a prime with most sprayable fluids.

Returning to the operation of the system and assuming that pump 18 is pumping paint into tube 172, the paint flows under pressure through tube 172 into high pressure hose 22 which conducts the paint to the inlet 380 of gun 26. When trigger 410 is off, the paint floods bore 316 and flows rearwardly therein primarily in the annular space between filter 370 and the wall of bore 316. The paint then leaves bore 316 via outlet passage 385 and flows past the open check valve 386, through ports 396 to passage 400 and then via return hose 24 and return tube 28 back into container 20.

Pump 18 is normally operated continuously, and hence whenever the trigger is in the off position, there is a continuous recirculation of paint from container 20 to the gun barrel and back to the container. Thus whenever the paint is not being sprayed, it flows along the surface of filter 370 to effect a washing action which tends to keep the filter clean of paint particles or other foreign matter. As long as the trigger is off, the paint is pumped at a relatively low pressure due to the relatively unrestricted passages of the recirculating circuit. This provides an important safety factor inasmuch as potentially dangerous high pressures are not built up in the hose line or gun chamber when the gun is idle. The low pressure recirculation feature also reduces power consumption and wear of the parts.

Assuming that pump 18 is operating and that paint is flowing through the gun as described above, paint may be sprayed onto a surface to be coated by pulling trigger 410 towards handle 304. This causes trigger 410 to pivot about pin 412, thereby pivoting lever 416 upwardly to force plunger 392 upwardly until its stem 390 drives ball 386 closed against seat 388. Due to the high mechanical advantage of the trigger linkage, only ordinary finger pressure is required to seat ball 386 and to hold it seated as pressure builds up in the bore 316. This pressure build-up occurs very rapidly until it reaches a predetermined value (as determined by the adjustment of plug 367 on spring 366), at which point the fluid pressure acting on the exposed forward area of ball 338 is sufficient to overcome the force of spring 366, whereupon plunger 352 moves rearwardly to thereby crack ball 338 off its seat 336. Once ball 338 is unseated, the remainder of its forward area becomes exposed to the fluid pressure in bore 316, greatly increasing the rearwardly acting force on plunger 352 so that it opens with a "pop" or snap action. When ball 338 is thus opened, paint flows at high pressure from inlet 380 radially through filter screen 371, then past ball 338 into discharge passage 334 and through the restricted orifice 330 which hydraulically atomizes the paint into a suitable spray pattern for application to the object or surface to be sprayed.

When trigger 410 is released, spring 394 forces plunger 392 downwardly, allowing the pressure of paint in bore 316 to unseat ball 386, thereby permitting the paint to recirculate once more into the low pressure return line 24. The resulting rapid drop in pressure in bore 316 permits spring 366 to drive plunger 352 forwardly to reseat ball 338 and thereby close communication between the bore 316 and passage 334.

Since airless paint spraying is based upon the principle of pumping fluid at high pressure through an extremely small orifice 330, it is very important that any solid particles in the fluid medium being pumped be removed or filtered from the medium before they reach orifice 330. Although the recirculation feature of the present invention helps keep filter 370 clean, nevertheless the filter may eventually become clogged by oversized paint particles or foreign debris depending upon the quality of the paint used. Hence, filter 370 is preferably a throw-away type cartridge filter which, upon becoming clogged, may be easily removed from either the front or the rear of the gun. For front removal, fitting 318 is unscrewed so that filter 370 may be slid forwardly off of plunger 352 and a clean filter inserted in its place. For rear removal, fitting 340 is unscrewed and then the entire subassembly of fitting 340 and plunger 352 is withdrawn from barrel 310, after which the old filter 370 is slipped off of plunger 372 and a new one sleeved on the plunger in its place. When the parts are reassembled as shown in FIG. 5, spring 378 will be compressed to hold the forward grommet 372 sealed against the adjacent face of fitting 318.

When the fluid being sprayed is paint, an initial water flushing procedure is recommended if the equipment has not been in use for some time or when changing from one color of paint to another. In this procedure pump 18 and return tube 28 are first placed in a can of water. Then motor 12 is turned on to operate pump 14. If the unit does not begin pumping within approximately one-half minute, switch 72 is turned off and pump 18 is hand primed for approximately 10 to 15 strokes. Then switch 72 is turned back on to operate pump 18 to circulate water through the system for two or three minutes to flush out the residual fluid, if any, remaining in the equipment and hoses from previous use.

While the unit is pumping water, trigger 410 may be pulled two or three times to insure that orifice 330 is not clogged. A clogged or partially clogged condition is readily apparent from the spray pattern. If the unit is operating properly, motor 12 is again turned off.

As illustrated in FIG. 7, the next step is to raise return tube 28 about seven inches by pulling it straight up until its outlet end clears the water can, whereupon tube 28 may be swiveled approximately 90 degrees to place its outlet end over a waste can 430. The water can is then replaced with paint container 20 so that pump 18 is submerged in the paint with its inlet fitting 234 disposed near the bottom of the container. Motor 12 is again started to operate pump 18 which will normally remain primed with the flushing water and thereby be self-priming in the paint. The water presently in the system will be expelled therefrom via return tube 28 into the waste container as the paint is introduced into the system by pump 18. After approximately one pint of water has been pumped from tube 28 into the waste container 430, the paint will begin flowing from tube 28 into the waste container. The return tube is then lifted from the waste container, swiveled back over the paint container 20 and then dropped down into the paint where it remains during the spraying operation. Waste can 430 is placed adjacent the paint can 20 so that there is no spillage problem involved in this procedure.

From the foregoing description, it will now be apparent that the apparatus of the invention provides many advantages not hitherto found in liquid spraying equipment.

The present apparatus accomplishes airless paint spraying from a completely portable system wherein the apparatus is entirely self-contained in a cabinet which is easily carried by one man and need only be plugged into any standard electrical outlet to be ready for immediate use. In one illustrative embodiment, the complete system weighs only 40 pounds and measures only 18 inches by 15 inches by 8 inches. Since an air compressor is not required, the system is comparatively low cost in addition to being portable and compact.

Since the unit may use a small electric motor for power it can be operated safely from any house lighting circuit, which in turn means that the unit can be plugged into the outlet in each room as it is moved from room to room, thereby reducing the length of electrical extension cords and spray hoses required.

The equipment of the invention has been found to produce finishes of the highest quality on all surfaces including metal, wood, plastic, brick, acoustical tile, etc. It provides fast, smooth, one pass coverage. For example, the system is capable of spraying latex, alkyd flats, enamel, varnishes, etc. with speeds up to ½ of a gallon per minute. Due to the airless nature of the spray, over-spray and paint dust distribution problems are eliminated. The paint may be taken directly from its original container, which may range in size from a quart to a five gallon can. In addition, the system of the invention lends itself to other applications involving pumping high pressure abrasive liquids other than paint. The system is well adapted to withstand the wearing acting of such liquids since the liquid being pumped does not contact any moving parts except the two tungsten carbide balls 266 and 278, seats 264 and 276 and the synthetic rubber diaphragm 244.

The recirculation of paint during the off duty cycle keeps the paint continually mixed and reduces clean-up time considerably. This low pressure recirculation provides an important safety factor, assists in the priming procedure and produces a continuous mixing of the paint in container 20.

The apparatus of the present invention also provides improved results in terms of uniformity of paint spray pattern due to high frequency of its pumping action.

Referring to FIG. 8, there is shown a modified control valve unit 500 of the present invention which adapts the above-described paint pumping apparatus for use with a suitable commercially available high pressure airless spray gun of the type having only one hose connection, namely a high pressure line for supplying liquid paint to the gun. Valve unit 500 may be mounted within cabinet 10 in any convenient location, such as in the space above motor 12. Unit 500 comprises a cylindrical sleeve 502 closed at one end by a screw plug 504 threadably received in internal threads 506 of sleeve 502. Plug 504 carries a cylindrical rod 508 which extends axially into a bore 510 of sleeve 502 to support a cylindrical filter 512 which may be identical in construction to filter 370. A compression coil spring 514 interposed between plug 504 and a grommet 516 of the filter serves to bias the grommet 518 at the other end of filter 512 into tight engagement with the tapered end of a valve fitting 520 which is threaded into a smaller bore 522 of the sleeve 502. The free end of rod 508 is spaced from the end of fitting 520 so that fluid can enter an inlet passage 524 of fitting 520. Passage 524 communicates with a valve chamber 526 of the fitting in which a check ball 528 is free to float between a hard, wear resistant valve seat 530 and a retaining pin 532.

A piston 534 is slidably disposed in a bore 536 in sleeve 502 with its end face 535 exposed to fluid in bore 522. Piston 534 has a pair of grooves 538 and 540 containing O-rings 542 and 544 respectively, each of which is backed up by a helical split Teflon ring 546. The lower end of piston 534 extends into a counterbore 548 and comprises a spring backup flange 550, a reduced diameter shank 552 and a terminal pin 554. A compression coil spring 560 encircles shank 552, the spring butting at one end against a dump valve 562 threaded into bore 548 and at the other end against shims 564 carried on shank 552 adjacent flange 550. Valve 562 has a chamber 566 in which a check ball 568 floats between a valve seat 570 and the upper end of a fitting 572 threaded into chamber 566.

The external fluid flow connections associated with unit 500 include an input line 22', similar in function to the previously described line 22, which communicates via a nipple 574 with bore 510 adjacent the end of filter 512 remote from the outlets from bore 510. A bypass line 576 communicates at one end with bore 510 via a nipple 578 which is threaded into sleeve 502 adjacent the outlet end of bore 510. The other end of bypass line 576 is connected to fitting 572 and communicates with valve chamber 566 via an interior passage 580 of the fitting. An output line 582 communicates at one end with bore 522 via a nipple 584 which is threaded into sleeve 502 at bore 522. The other end of line 582 is suitably adapted for a connection to the aforementioned known type of airless spray gun and constitutes the only line connected to the gun. A return line 24', similar in function to the previously described line 24, is connected to a nipple 586 which is threaded into sleeve 502 for uommunication with bore 548, the other end of line 24' communicating with the paint container 20 as described in connection with return line 24 of the previous embodiment.

The modified control unit 500 incorporates the paint filtering and recirculation features of the previously described embodiment of the invention without requiring a return line connection to the spray gun. Such conventional spray guns customarily have a spray nozzle similar to nozzle 326 and a trigger operated valve which opens and closes fluid communication between supply line 582 and the spray orifice of the nozzle. Such a gun is not shown herein since the same is conventional.

In the operation of unit 500, paint is supplied under high pressure via line 22' to the interior of bore 510. Assuming that the spray gun valve is closed, when the paint is first pumped into the unit it flows downwardly along filter 512 through fitting 520 past check valve 528 into bore 522 and thence into line 582. Also, some of the paint will bypass check valve 528 via line 576 until it floods valve chamber 566 and forces ball 568 tightly against its seat 570. While the unit is being flooded with paint piston 534 is held by spring 560 with its flange 550 abutting the shoulder 551 formed at the junction of bores 548 and 536. In this position, pin 554 is spaced from check ball 568 so that the ball is free to seat against seat 570.

After the unit is flooded with paint, fluid pressure builds up in bore 522 until it reaches a predetermined value whereupon the force exerted by the pressurized paint on the end surface 535 of the piston is sufficient to overcome the force of spring 560, thereby causing piston 534 to move toward check ball 568 until pin 554 dislodges ball 568 and holds the same in open position as shown in FIG. 8. Once ball 568 is unseated, communication is opened between bore 510 and return line 24 via bypass line 576 and the recirculating valve 562. By way of example, piston 534 and spring 560 may be designed such that the fluid pressure in bore 522 must build up to 1900 p.s.i. before piston 534 will move a sufficient distance toward ball 568 to unseat the same to open the bypass line 576 to initiate the recirculation of paint. This "dump" pressure is adjustable by varying the number of shims 564 interposed between spring 560 and flange 550.

It is to be noted that ball 568 is held seated by a force determined by fluid pressure in chamber 566 multiplied by the effective working area of ball 568 exposed to chamber fluid when seated. When ball 568 is cracked off its seat, this seating force is substantially instantaneously dissipated due to pressure fluid acting on the entire surface of ball 568. Thus there is a rapid decrease in the force resisting movement of piston 534 toward a ball 568, thereby causing a sudden movement of the piston which in turn produces a snap action opening of ball 568. This action is advantageous in that it results in a large and rapid pressure drop in bypass line 576 and hence in bore 510, causing a rapid seating of ball 528 so that the shutoff action is both positive and rapid. Any tendency of the pump to labor due to ball 568 floating near seated position under a dynamic equilibrium condition is also thereby overcome.

When the dump valve 562 is opened, fluid pressure drops in bore 510, creating a reverse pressure differential between the fluid in bores 522 and 510 which forces ball 528 back onto its seat 530, thereby trapping the fluid in bore 522 and the supply line 582 to the gun. Thereafter the pressure continues dropping in bore 510 until it reaches a relatively low recirculation pressure of say 50 p.s.i. This in turn increases the reverse pressure differential between the trapped high pressure fluid in bore 522 and the recirculating paint in bore 510, thereby tightly seating check ball 528 so that no leakage of the trapped fluid in bore 522 occurs and thus insuring that dump valve 562 is maintained in open position by piston 534 so long as the spray gun discharge valve is closed. The bypass dump valve 562 thus will remain in open condition so long as the spray gun is turned off, thereby recirculating the paint from the pump through the filter chamber 510, where it washes filter 512 as in the previous embodiment, and then back via line 24′ to the paint container 20. The recirculation pressure is relatively low compared to spray pressures so that power consumption and wear on the operating parts of the recirculation system is minimized.

Whenever it is desired to spray paint from the spray gun, the operator pulls the trigger of the gun, thereby opening the discharge valve of the gun. This causes a sudden pressure drop in bore 522, allowing spring 560 to move piston 534 upwardly as viewed in FIG. 8 until flange 550 abuts shoulder 551, whereupon the pressure of paint in the bypass line forces ball 568 closed against its seat 570. Once check ball 568 is closed, pressure builds up rapidly in bore 510 until it overbalances the dropping pressure in bore 522, thereby unseating check ball 528 so that pressurized paint flows from bore 510 via bore 522, valve passage 524 and line 582 to the spray gun. Due to the high resistance offered by the nozzle of the spray gun, paint pressure will build up quickly to an operating pressure just below the pressure required to move piston 534 downwardly against the pressure of spring 560. For example, for a "dump" pressure of 1900 p.s.i., the operating pressure may be approximately 1800 p.s.i.

When the gun trigger is released to shut off the discharge of paint from the spray nozzle, pressure rapidly increases in line 582 and bore 522 to the predetermined dump pressure, thereby forcing piston 534 to open valve 562. Ball 568 opens suddenly due to the aforementioned snap action effect, thereby causing rapid and positive seating of check ball 528 in response to the sudden release of pressure in bore 510 as the paint resumes flowing through the recirculation circuit comprising bore 510, bypass line 576, dump valve 562, bore 558 and return line 24′.

It will now be understood that the control unit 500 of the present invention provides a quick acting pressure responsive valve system adapted for remote control by a conventional single line airless spray gun, unit 500 cooperating with the paint pumping apparatus of the invention to supply paint at high pressure when the gun discharge valve is open and to recirculate paint at low pressure when the gun valve is closed.

Referring to FIG. 9, there is shown a modified paint pumping unit 600 of the present invention which is generally in the form of a cylindrical two piece casing, one piece of which comprises a cylindrical sleeve 602. Sleeve 602 has an enlarged diameter bore 604 extending axially from the open lower end of the sleeve upwardly to a reduced diameter counterbore 606 which in turn extends axially to the upper end of sleeve 602. Bore 606 receives a tubular pressure conduit 608, the lower end 610 of which is flared outwardly and clamped by a threaded fitting 612 which is screwed upwardly into threads 614 formed in the enlarged lower end of bore 606. Sleeve 602 is supported for suspension in a paint container by the large diameter tube 16 as in the previous embodiment, tube 16 being secured to the upper end of sleeve 602 by a nut 616 which tightly clamps the lower flared end of tube 16 against the conical end surface 617 of sleeve 602. However, tube 608 rather than tube 16 is suitably connected to the output line 52 of pulse pump 14.

The other principal part of the pump casing comprises a part 618 which has an externally threaded extension 620 threadably received in the internally threaded open lower end of sleeve 602. Extension 620 also has internal threads in which is threaded the lower end of a resilient tubular pump diaphragm 622. The upper end of diaphragm 622 is closed by an integral plug portion 624, diaphragm 622 being dimensioned so that upper end 624 is spaced from the lower end of fitting 612 when part 618 is fully screwed into sleeve 602. The outer periphery of diaphragm 622 is spaced from the wall of bore 604 to provide an annular pressure fluid chamber 626 therebetween which communicates with the interior of tube 608 via the passage in fitting 612.

The hollow interior of diaphragm 622 communicates with a bore 628 in part 618 which terminates at its lower end in a counterbore 630 in which the lower end of an upright inlet tube 632 is secured. The lower portion of bore 630 is internally threaded to receive a valve fitting 634 containing a check ball 636 which is movable in a valve chamber 638 of the valve fitting between a retaining pin 640 and a hard, wear resistant valve seat 642. Valve fitting 634 extends into a threaded extension 644 of part 618 which threadably receives a filter cap 646 identical to the previously described cap 234 to thereby provide the inlet to the pump. An elbow fitting 648, having a nipple 650 threaded into a radial bore 652 in the side of fitting 618, communicates with bore 628 and forms the outlet of the pump. An outlet check valve assembly 654 is threaded into a vertical bore 656 of the elbow and contains a check ball 658 movable between a retaining pin 660 and a hard, wear resistant valve seat 662. One end of a high pressure tubular conductor 664 is secured to valve 654 by an adapter fitting 666 and a clamping nut 668. The other end of conductor 654 may be connected to line 22 when using the spray gun 26 or to line 22′ when using the control unit 500.

In accordance with one feature of the modified paint pump 600, sleeve 602 of the two part casing when inverted provides a cup-shaped part which facilitates filling of the closed hydraulic fluid pulsing system of the pump. Thus, when initially filling the closed fluid system or when replacing the hydraulic fluid therein, part 618 is first screwed out of sleeve 602 to thereby remove the subassembly comprising inlet valve 634, cap 648, diaphragm 622, elbow 648 and associated outlet valve connections. A plug 115 is then unscrewed from a threaded opening in the bottom of cylinder 114 to thereby vent pulse chamber 132 to atmosphere. Then cabinet 10 together with tube 16 and sleeve 602 are inverted so that sleeve 602 is at a higher elevation than pump unit 14 and its crankcase 80. Hydraulic fluid is then poured into the open and now upper end of bore 604 from which it runs down bore 604, through tube 608, into the pulse pump chamber 132 and cylinder 114 until the system is full. Then fitting 618 is screwed back into the inverted sleeve 602, thereby displacing any excess fluid trapped in bore 604 past the external threads of extension 620 until the same is substantially fully secured in sleeve 602, while also displacing fluid out of the vent opening of cylinder 114. Plug 115 is then screwed back into cylinder 114 and pump 500 and cabinet 10 are then turned upright.

The operation of paint pump 600 is similar to that of pump 18 but the volume of the closed fluid pulsing system of pump 600 is substantially reduced to thereby reduce compressibility losses in the hydraulic fluid pumping medium. The reduction in volumetric capacity of the closed pressure fluid pulsing system results from the relocation of outlet valve 654 and the use of a narrow diameter tube 608 for conducting the hydraulic fluid rather than the larger tube 16. Tube 16 in this embodiment merely serves as a support for the pump 600, the clearance space between tube 608 and its surrounding tube 16 merely being filled with air.

In operation, reciprocation of piston 108 of pulse pump 14 causes the fluid pressure in tube 608 and chamber 626 to fluctuate periodically at the frequency of pump reciprocation to thereby alternately compress and release pumping diaphragm 622. When diaphragm 622 is compressed, the paint within the diaphragm forces inlet check ball 636 closed against its seat 642 and forces outlet check 658 off its seat to pump the trapped paint into line 664. When fluid pressure drops in chamber 626, the resiliency of diaphragm 622 causes it to expand back to its normal shape as shown in FIG. 9, thereby allowing outlet valve 654 to close and sucking liquid paint from the container upwardly past inlet check valve 634 into the diaphragm.

Another feature of the modified pump 600 is the construction of diaphragm 622 which preferably is molded in cylindrical form from a plastic material, preferably a polyethylurethane composition. This material is well adapted for use submerged in hydraulic fluid such as oil and for conducting abrasive liquid paint through its interior. In addition it has been found that when properly dimensioned, a diaphragm made of this material has sufficient elastic memory to permit elimination of a supporting spring such as spring 270 employed with diaphragm 244.

A further feature of the modified pump 600 is the provision of the inlet tube 632 which extends into the open end of diaphragm 622 and is disposed concentrically therein with its outlet end adjacent plug 624 to insure that the paint is efficiently sucked into and expelled from pump 600. Tube 632 also serves as a supporting core for diaphragm 622 which prevents excessive radial contraction and distortion of the diaphragm which would otherwise cause undue wear and fatigue under high pressure operation.

What is claimed is:

1. A gun for spraying liquid under pressure including in combination means forming a pressure chamber in the gun, means connecting said chamber with a source of spray liquid under pressure, a spray nozzle connected to said gun and having a passage communicating with the chamber shaped to atomize pressurized liquid passing therethrough into a spray, an outlet valve adapted to close said nozzle passage, means for biasing said outlet valve to closed position, means for returning the pressure fluid from said chamber back to said source, a normally open trigger valve actuatable to close said return means to build up pressure in said chamber, said outlet valve including means having a working surface exposed to the pressure fluid in said chamber such that the fluid acting on said working surface develops an opening force on said valve in response to said pressure buildup operable to open said outlet valve at a predetermined pressure.

2. A spray gun for spraying liquid under high pressure comprising a barrel having a chamber adapted to receive pressure fluid, a nozzle connected to one end of said barrel and having a discharge orifice extending therethrough communicating at one end with said chamber, a plunger extending axially of said barrel and reciprocable therein, a valve movably carried by said plunger for opening and closing said one end of said discharge orifice, means for actuating said plunger to open and close said valve, a cylindrical filter encircling said plunger and extending axially in said barrel in spaced relation from the wall of the barrel, means for urging one end of said filter against said nozzle such that said one end of the filter abuts the nozzle and encircles said one end of said discharge passage and means sealing the space between the other end of the filter and said plunger whereby pressure fluid admitted to said barrel flows through said filter on its way to said discharge passage, said barrel having an inlet for admitting the pressure fluid located adjacent said one end of said discharge passage and said barrel having an outlet spaced axially from said inlet remote from said nozzle whereby liquid admitted to said chamber when said valve is in closed condition flows axially of the chamber from said inlet to said outlet along the exterior surface of said filter.

3. Apparatus for spraying liquids under high pressure comprising a cabinet, an electric motor mounted in said cabinet and having a rotary output shaft extending from one end thereof in said cabinet, a casing adjacent one end of the motor, said motor shaft extending into said casing, a cylinder connected to said casing and having a piston reciprocable therein with one end of said piston extending into said casing, means operably connecting said motor shaft to said piston to convert rotary motion of the shaft to reciprocating motion of the piston, said cylinder having a working chamber, said piston having an end remote from said casing defining a movable wall in said working chamber, pressure fluid conductor means connected to said working chamber and including a rigid tubular conductor extending from said cabinet, means supporting one end of said conductor in said cabinet, a pump supported on the other end of said conductor exteriorly of the cabinet, and adapted for submergence in a container containing the liquid to be sprayed, said pump having a fluid chamber communicating with said working chamber of the cylinder via said conductor, and a diaphragm disposed in said pump chamber, said pump including flow passage means having an inlet and an outlet and valves associated therewith cooperable with said diaphragm in response to expansion and contraction of said diaphragm produced by fluid pressure pulsations in said pump chamber to pump liquid from the container to said outlet, said pulsations causing said pump and said rigid tubular conductor to vibrate to thereby effect a stirring action on the liquid in the container.

4. The combination set forth in claim 3 wherein said casing contains an oil reservoir and said piston operates submerged in said reservoir, said piston having a passage therethrough communicating at one end with said reservoir in all positions of the piston and at the other end with said working chamber of the cylinder, said piston having a valve operable therein to close said passage in the piston in response to a given range of pressure of the fluid in the working chamber acting on the valve, said valve unseating to open said passage to admit oil from said reservoir into said working chamber when the fluid pressure falls below said range to thereby replenish the supply of oil in said working chamber.

5. Apparatus for spraying liquids under high pressure comprising a cabinet, an electric motor mounted in said cabinet and having a rotary output shaft extending from one end thereof in said cabinet, a casing adjacent one end of the motor, said motor shaft extending into said casing, a cylinder connected to said casing and having a piston reciprocable therein with one end of said piston extending into said casing, means operably connecting said motor shaft to said piston to convert rotary motion of the shaft to reciprocating motion of the piston, said cylinder having a working chamber, said piston having an end remote from said casing defining a movable wall in said working chamber, pressure fluid conductor means connected to said working chamber and including a rigid tubular conductor extending from said cabinet, means supporting one end of said conductor in said cabinet, a pump supported on the other end of said conductor exteriorly of the cabinet, said pump having a fluid chamber communicating with said working chamber of the cylinder via said conductor, a tubular diaphragm disposed in said pump chamber having inlet and outlet valves associated therewith operable in response to expansion and contraction of said diaphragm produced by fluid pressure pulsation in said pump chamber, inlet means connecting one end of said diaphragm to the exterior of said pump and an output line connected to the other end of said diaphragm, said output line extending from said casing into said cabinet via the interior of said tubular conductor in spaced relation from the interior of the tubular conductor, and further including a manifold block mounted on said casing having a passage formed therein with ports leading to the exterior of the manifold, said conductor means including a tube connected at one end to the working chamber of the cylinder and at the other end to one of said ports, said tubular conductor of said conductor means being connected to a second one of said ports, said output line extending through said tubular conductor into said manifold passage via said second port and out of said passage via a third one of said ports, and a manually operated priming pump including a cylinder communicating at one end with the fourth one of said ports and having a working chamber communicating with said manifold passage via the fourth port.

6. Liquid pumping means including in combination a rigid cylindrical casing having an axial bore extending therethrough, a filter mounted at one end of said casing covering one end of said bore, a flexible tubular diaphragm disposed within the bore of said casing and defining with the casing an annular chamber encircling said diaphragm, an inlet fitting secured to one end of said diaphragm and having a seal fit in the end of said bore adjacent the filter, said fitting having an inlet passage communicating with said bore adjacent said filter, an inlet check valve disposed in said inlet fitting controlling said inlet passage, a second fitting secured to the other end of said diaphragm and having an outlet valve and a discharge passage therein controlled by said outlet valve, said second fitting being spaced from the wall of said casing bore, a first tubular conductor secured to the other end of said casing and communicating with said casing bore, and a second tubular conductor extending axially within said first conductor and into said casing bore fitting and connecting with said second fitting for communication with said discharge passage, said second conductor defining with said casing bore and said first conductor an annular clearance space communicating with said casing chamber, said second fitting being spaced axially from said other end of said casing to permit axial movement of said diaphragm in response to expansion and contraction thereof resulting from fluid pressure fluctuations in the chamber of the casing.

7. Apparatus for high pressure airless spraying of liquid including in combination pump means including a pump chamber, a diaphragm having one side exposed to and forming a movable wall of said pump chamber, inlet means connected to said pump chamber and adapted for connection to a source of the liquid to be sprayed, outlet means connected to said pump chamber, inlet and outlet check valve members made of hard, wear-resistant material disposed respectively in said inlet means and said outlet means and being cooperable with alternating flexure of said diaphragm to pump the spray liquid via said inlet and outlet means, a closed pressure chamber filled with liquid and communicating with at least a portion of said diaphragm on a side thereof opposite said one side thereof, pulse means adapted to generate a pulsating pressure on the body of liquid in said pressure chamber to produce said alternating flexure of said diaphragm and liquid spray means connected to said outlet means of said pump including a nozzle having a restricted orifice for atomizing into a spray pattern the spray liquid pumped thereto by said pump means, said pulse means producing a pulsation of sufficient pressure and frequency via said body of liquid on said spray liquid at said orifice to cause a substantially uniform spray pattern as the pressurized spray liquid is reduced to atmospheric pressure by discharge through said orifice.

8. The combination set forth in claim 7 wherein said diaphragm comprises a wear-resistant tubular member and said opposite side thereof exposed to the liquid in said pressure chamber is an exterior surface of said tubular member and said one side thereof exposed to the spray liquid being pumped is an interior surface of said tubular member, and said pulse means comprises a portable source of power having rotary output means, a piston coupled to said rotary output means and reciprocated thereby in said pressure chamber at a relatively rapid rate to produce said pulsating pressure on said body of liquid contained in said pressure chamber.

9. The combination set forth in claim 8 wherein said pump means comprises a casing having an internal cup-shaped cavity opening at one end of said casing adapted to receive said diaphragm with the exterior of said diaphragm spaced from the interior surface of said cavity to define said pressure chamber, and a fitting adapted to serve as a closure for said one end of said casing, said casing and said fitting having cooperating thread means for threadably securing the same together, said tubular diaphragm and said inlet and outlet valve means being mounted on said fitting for removal therewith upon detachment of said fitting from said casing, means closing the end of said diaphragm remote from said fitting, the opposite end of said diaphragm being secured to said fitting and communicating via said fitting with said valve means, said pulse means including a liquid conductor communicating with the end of said cavity remote from said one end thereof.

10. The combination set forth in claim 9 wherein said inlet valve means comprises a check valve supported in said fitting and having inlet passage means communicating with the exterior of said fitting and outlet passage means comprising a rigid hollow tube extending concentrically into the hollow interior of said diaphragm for conducting the liquid to be sprayed from said check valve to a point adjacent the closed end of said diaphragm, the exterior of said tube being spaced from the interior walls of said diaphragm to define a flow space within said diaphragm for liquid discharged from said tube, said outlet valve means communicating with said flow space adjacent said inlet valve means.

11. Apparatus for spraying liquids under high pressure comprising a cabinet, an electric motor mounted in said cabinet and having a rotary output shaft extending from one end thereof in said cabinet, a casing adjacent one end of the motor, said motor shaft extending into said casing, a cylinder connected to said casing and having a piston reciprocable therein with one end of said piston extending into said casing, means operably connecting said motor shaft to said piston to convert rotary motion of the shaft to reciprocating motion of the piston, said cylinder having a working chamber, said piston having an end remote from said casing defining a movable wall in said working chamber, pressure fluid conductor means connected to said working chamber and including a rigid tubular conductor extending from said cabinet, means supporting one end of said conductor in said cabinet, a pump supported on the other end of said conductor exteriorly of the cabinet and adapted for submergence in a container containing the liquid to be sprayed, said pump having a fluid chamber communicating with said working chamber of the cylinder via said conductor, a diaphragm disposed in said pump chamber, said pump including flow passage means having an inlet and an outlet and valves associated therewith cooperable with said diaphragm in response to expansion and contraction of said diaphragm produced by fluid pressure pulsations in said pump chamber to pump liquid from the container to said outlet, an output line connected to said outlet, a spray gun having a fluid chamber, a nozzle and means including a valve operably connecting said nozzle via said gun chamber to said output line, a return line connected to said gun chamber and running back into said cabinet and a return tube connected to said return line and mounted in said cabinet for vertical and pivotal movement, said return tube having a portion disposed exteriorly of the cabinet for returning the pumped liquid from said gun to an area generally adjacent said pump.

12. Apparatus for spraying liquid including in combination a source of the spray liquid, a pump having an inlet connected to said source and an outlet for discharging the liquid pumped from said source, a casing having a liquid chamber therein, a filter extending within said chamber and having one side spaced from the wall of said chamber to define a flow space extending along said one side of said filter for the major portion of its length, means sealing the opposite ends of said filter from said flow space, means connecting the outlet of said pump to said chamber adjacent one of said ends of said filter, liquid spraying means comprising a conduit communicating with the side of said filter opposite said one side adjacent the other of said ends thereof and a spray nozzle having a spray orifice communicating with said conduit and valve means for opening and closing communication between said orifice and said opposite side of said filter via said conduit, return line means communicating with said chamber adjacent said other end of said filter and with said source and including valve means for opening and closing said return line and means for opening said return line valve means when said spray orifice valve means is closed and for closing said return line valve means when said spray orifice valve means is opened.

13. The combination set forth in claim 12 wherein said filter is cylindrical and further including a rod received in said filter via said one end thereof and extending therein for the major portion of its length, said sealing means including a first grommet secured to said one end of said filter and receiving said rod with a sliding seal fit and a second grommet secured to the other end of said filter, said liquid spraying means including a fitting having an annular abutment surface adapted to receive said second grommet thereagainst and having a passage communicating with the interior of the filter within the confines of said second grommet, and a spring encircling said rod and bearing against said first grommet to urge said filter toward said fitting to maintain said second grommet in abutment therewith.

14. The combination set forth in claim 12 wherein said return line valve means comprises a check valve urged to closed position by the pressure of spray liquid in said casing chamber, means for opening said check valve including a second chamber communicating with said conduit, a piston in said second chamber having a working surface exposed to pressure fluid therein, a spring urging the piston into said second chamber against the pressure of liquid therein and means operably connecting said piston and check valve for opening said check valve when said piston moves against the force of said spring in response to a predetermined liquid pressure in said second chamber, and a second check valve connecting said casing chamber with said piston chamber and adapted to close said connection when the pressure in said piston chamber exceeds the pressure in said casing chamber.

15. In an apparatus for high pressure airless spraying of liquid including a pump having an inlet adapted to be connected to a source of the spray liquid and having an outlet for discharging the liquid from said pump, the combination therewith of a self-washing filter comprising a casing having a liquid chamber therein, a filter extending within said chamber and having one side spaced from a wall of said chamber to define a flow space extending along and between said one side of said filter and said wall, inlet means connecting said flow space with said pump outlet, first outlet means communicating with said liquid chamber on the side of said filter opposite said one side thereof for conducting liquid filtered through said filter from said chamber for transfer to a hydraulic atomization spray nozzle, and second outlet means communicating with said flow space in said liquid chamber, said inlet and second outlet means being spaced from one another along said one side of said filter, and a bypass line connecting said second outlet back to said source of spray liquid whereby liquid pumped from said source is caused to bypass said first outlet means and flow along said one side of said filter to produce a washing action on said filter.

16. A filter unit for filtering liquid supplied to a high pressure airless liquid spraying apparatus comprising a casing having a liquid chamber therein, a filter extending within said chamber and having one side spaced from a wall of said chamber to define a flow space therebetween extending along one side of said filter for the major portion of said filter exposed to liquid in said chamber, means removably mounting said filter in said chamber, means including said filter defining a filtered liquid space in said chamber to which the side of said filter opposite said one side is exposed, an inlet communicating with said flow space adjacent one end thereof and adapted for connection to a source of supply of said spray liquid, a first outlet communicating with the filtered liquid space in said chamber and adapted for conducting filtered liquid therefrom to the high pressure airless liquid spraying apparatus, and a second outlet communicating with said flow space at a point spaced from said inlet, said second outlet being adapted for connection to the source of spray liquid for conducting liquid from the flow space in bypass relation to said first outlet to thereby cause a flow of liquid along said one side of said filter to effect a washing action thereof.

17. In combination, pulse generating means for producing periodic pressure fluctuations in a closed pressure fluid system comprising means forming a closed pressure fluid chamber including a movable member resiliently yieldable for expanding the volume of said closed pressure fluid chamber, a casing forming a fluid reservoir, a cylinder connected to said casing, a piston mounted for reciprocation in said cylinder and having one end extending into said reservoir and having another end remote from the reservoir forming a movable wall of a fluid pressurizing working chamber in said cylinder, means for reciprocating said piston, means for connecting said working chamber to said fluid chamber of the closed pressure fluid system, said piston having a passage therein communicating with the working chamber and with the reservoir in said casing, said piston having a valve member and associated valve seat in said passage on the side of said valve member remote from said working chamber, means in said passage loosely confining said member for limited movement adjacent said seat in the direction of piston travel, said valve member being normally forced against said seat when the pressure of fluid in said working chamber remains within a given range, said valve member unseating in response to inertial forces acting on the same overcoming the fluid pressure differential existing between the fluid reservoir and the working chamber to admit fluid from the reservoir into said working chamber when the fluid pressure falls below said range to thereby replenish the supply of fluid in said closed pressure fluid system.

References Cited by the Examiner

UNITED STATES PATENTS

| | | | |
|---|---|---|---|
| 1,764,712 | 6/1930 | Brackett et al. | 103—44 |
| 1,835,865 | 12/1931 | Hansen | 239—575 X |
| 1,838,735 | 12/1931 | Berg | 222—385 |
| 1,852,242 | 4/1932 | Holt | 103—44 |
| 2,262,102 | 11/1941 | Hunter | 239—590.3 X |
| 2,705,663 | 4/1955 | Gilbreath | 239—124 X |
| 2,812,716 | 11/1957 | Gray | 103—44 X |
| 2,936,959 | 5/1960 | Nord et al. | 239—127 |
| 2,954,738 | 10/1960 | Di Vette | 103—44 |
| 2,969,926 | 1/1961 | Peeps | 239—124 X |
| 3,018,968 | 1/1962 | Levey | 239—127 X |
| 3,100,451 | 8/1963 | Limpert et al. | 103—44 X |

FOREIGN PATENTS 452,421   1913   Great Britain.

M. HENSON WOOD, JR., *Primary Examiner.*

VAN C. WILKS, *Assistant Examiner.*